(12) United States Patent
Yopp et al.

(10) Patent No.: US 8,738,264 B1
(45) Date of Patent: May 27, 2014

(54) AUTOMATIC REVERSE BRAKE ASSIST SYSTEM

(71) Applicant: Ford Global Technologies, LLC, Dearborn, MI (US)

(72) Inventors: Wilford Trent Yopp, Canton, MI (US); Wangdong Luo, Auburn Hills, MI (US); Stephen Varghese Samuel, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/759,268

(22) Filed: Feb. 5, 2013

(51) Int. Cl.
| | |
|---|---|
| *G06F 19/00* | (2011.01) |
| *G06F 13/14* | (2006.01) |
| *G06G 3/04* | (2006.01) |
| *G06F 17/00* | (2006.01) |
| *G01C 21/26* | (2006.01) |
| *G08G 1/13* | (2006.01) |

(52) U.S. Cl.
CPC *G06F 13/14* (2013.01); *G06G 3/04* (2013.01); *G06F 17/00* (2013.01); *G01C 21/26* (2013.01); *G08G 1/13* (2013.01)
USPC ............... 701/70; 701/96; 701/300; 701/301; 303/122.01; 303/146; 303/155; 303/189; 303/191; 340/435; 340/436; 340/438; 340/459; 340/460; 180/167; 180/169; 180/171; 180/197; 180/274

(58) Field of Classification Search
CPC ......... G08G 1/143; G08G 1/04; G08G 1/166; B60W 2540/12; B60W 2420/42; B60W 2520/04; B60W 2540/02; B60W 2540/10; B60W 30/18036; B60W 40/09; B60R 25/2081; B60R 1/00; B60R 11/0235; B60R 2300/105; B60R 21/00; B60R 2300/103
USPC .......... 701/1, 28, 29.1, 31.4, 32.2, 36, 41, 45, 701/46, 48, 70, 96, 300, 301; 303/7, 9.69, 303/10, 15, 20, 22.1, 52, 113.1, 113.2, 303/113.4, 114.1, 115.2, 116.1, 122.01, 303/146, 155, 189, 191; 188/1.11 E, 1.11 L, 188/1.11 R, 2 D, 3 R, 112 R, 79.55, 358; 340/431, 539.1, 425.5, 435, 436, 438, 340/459, 460, 461, 517, 540; 307/9.1, 10.1; 180/197, 167, 169, 171, 274; 382/103, 382/104, 16, 107, 181, 199, 293; 250/208.1, 733, 734, 735
See application file for complete search history.

(56) References Cited

U.S. PATENT DOCUMENTS

| | | | |
|---|---|---|---|
| 4,893,691 A | | 1/1990 | Park |
| 6,129,025 A | * | 10/2000 | Minakami et al. ......... 104/88.01 |

(Continued)

FOREIGN PATENT DOCUMENTS

JP 2010163058 A 7/2010

OTHER PUBLICATIONS

Automatic Reverse Braking System, <http://www.projecttopics.info/Mechanical/Automatic_Reverse_Braking_System.php>.

(Continued)

*Primary Examiner* — McDieunel Marc
(74) *Attorney, Agent, or Firm* — Raymond Coppiellie; Ford Global Technologies, LLC

(57) ABSTRACT

An automotive vehicle braking system and method for controlling the same. The system includes an electronic controller communicatively coupled to a vehicle braking system and a vehicle motion detection device. The braking system is configured to be automatically activated in response to detection of an object in a path of the vehicle. Once activated, the braking system is deactivated either by the driver or a predetermined time period after detection that motion of the vehicle has stopped. Prior to deactivation of the vehicle braking system an HMI message is activated indicating imminent deactivation of the vehicle braking system.

14 Claims, 2 Drawing Sheets

(56) References Cited

U.S. PATENT DOCUMENTS

| | | | |
|---|---|---|---|
| 6,604,592 B2 | 8/2003 | Pietsch et al. | |
| 7,857,339 B2 | 12/2010 | Paulson | |
| 8,332,097 B2 * | 12/2012 | Chiba et al. | 701/36 |
| 8,386,114 B2 * | 2/2013 | Higgins-Luthman | 701/28 |
| 8,421,865 B2 * | 4/2013 | Euler et al. | 348/148 |
| 8,502,860 B2 * | 8/2013 | Demirdjian | 348/36 |
| 2005/0040939 A1 * | 2/2005 | Jobes et al. | 340/438 |
| 2005/0209762 A1 | 9/2005 | Lu et al. | |
| 2005/0246081 A1 | 11/2005 | Bonnet et al. | |
| 2007/0061487 A1 * | 3/2007 | Moore et al. | 709/246 |
| 2008/0154464 A1 * | 6/2008 | Sasajima et al. | 701/42 |
| 2010/0114445 A1 | 5/2010 | Groult | |
| 2010/0318256 A1 * | 12/2010 | Breuer et al. | 701/29 |
| 2011/0054756 A1 * | 3/2011 | Hecker et al. | 701/70 |
| 2012/0002052 A1 * | 1/2012 | Muramatsu et al. | 348/148 |
| 2012/0300072 A1 * | 11/2012 | Kim | 348/148 |

OTHER PUBLICATIONS

Intelligent Reverse Braking System, Abhishek Mishra and Anil KR. Upadhyay, <http://www.scribd.com/doc/94646980/Intelligent-Reverse-Braking-System>.

English Translation of JP 2010163058.

* cited by examiner

AUTOMATIC REVERSE BRAKE ASSIST SYSTEM

BACKGROUND

Various vehicles are equipped with reverse brake assist systems used to help prevent a driver from backing into an object in the rearward drive path. Such systems sense the presence of an object in the rearward path of the vehicle and take an action in response to such detection. For example, it is known to activate a sensory alarm (e.g., audible or visual) to alert the driver of the presence of an object in the rearward drive path. It is also known for the vehicle to automatically apply the vehicle brake system when an object is sensed in the rearward drive path. Such systems that automatically apply the brake system do so for a particular pre-determined amount of time after detection of the object, which may normally be sufficient to stop the vehicle before coming in contact with the object. However, the inventors have recognized that such automatic breaking systems are not as effective on low friction surfaces (e.g., ice, snow or rain) or on downward inclines as they are on normal high friction road surfaces. It is desirable to have an improved reverse brake assist system that is more effective on low friction and downward inclined surfaces.

SUMMARY

A method of deactivating a vehicle's reverse brake assist system that had been automatically activated in response to detection of an object in a rearward path of the vehicle is disclosed. The method comprises detecting when the rearward motion of the vehicle has stopped and deactivating the vehicle brakes a pre-determined period of time after the rearward motion of the vehicle has stopped.

DETAILED DESCRIPTION

A method of controlling the deactivation of a vehicle brake system is disclosed. The vehicle is configured to detect an object in the drive path (rearward or forward) of a moving vehicle, and, in response to such detection, automatically activate the vehicle brake system. Application of the brake system is deactivated when (i) the system detects that the vehicle has actually stopped, and (ii) a predetermined amount of time thereafter has elapsed. A human-perceptible alert is generated when application of the automatic brake system is deactivated.

Figure 1:
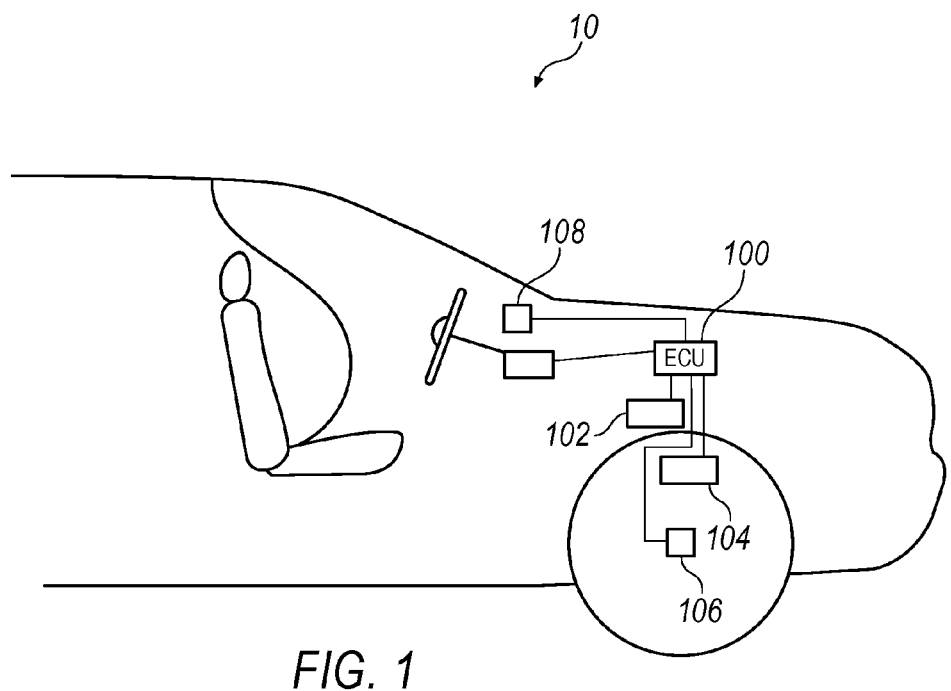
FIG. 1 is a simple illustrative schematic of an automotive vehicle in which an embodiment of the invention may be employed.
Figure 2:
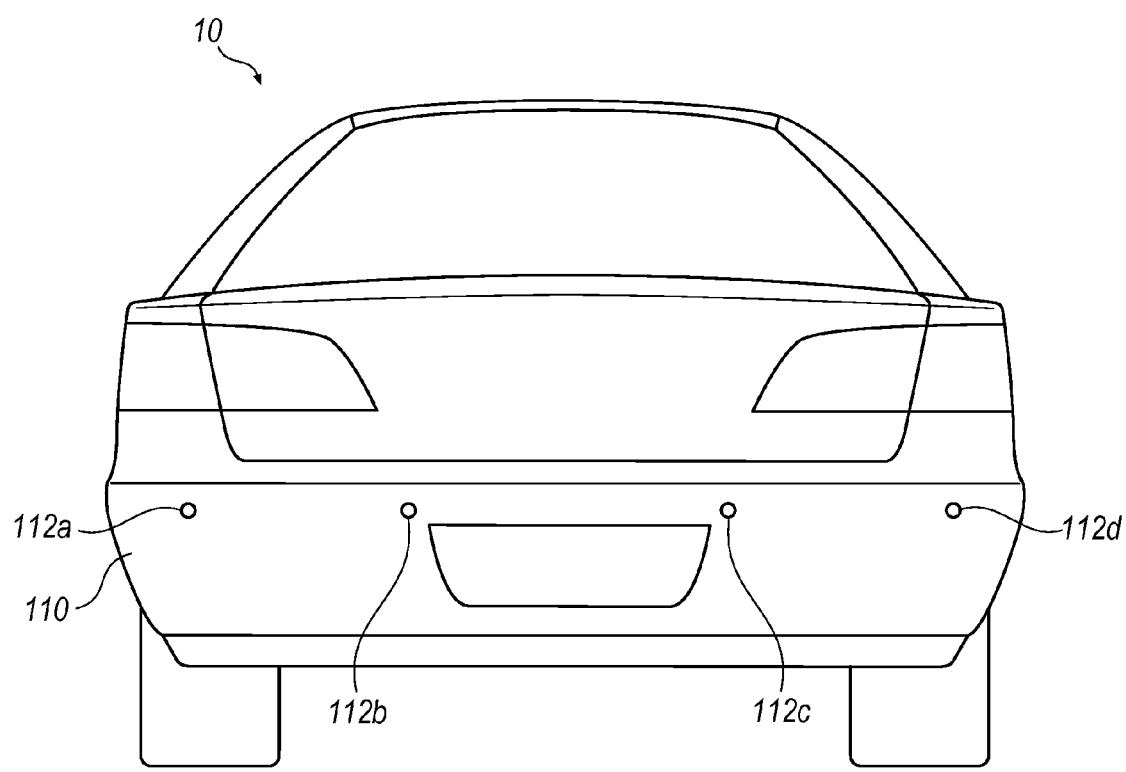
FIG. 2 is a simple illustrative schematic of a rear view of the automotive vehicle of FIG. 1, wherein an embodiment of the invention may be employed.

FIGS. 1 and 2 are simple schematics of a vehicle 10 (FIG. 1 showing a side view and FIG. 2 showing a rear view) in which the disclosed method of controlling a vehicle's reverse brake assist system may be employed. The vehicle 10 includes an electronic controller or electronic control unit (ECU) 100, which may be communicatively-connected (e.g., electrically or wirelessly) to a brake system 104, wheel speed sensors 106, an accelerometer 102, a Host Message Information (HMI) interface 108, and ultrasonic sensors 112a-112d positioned on rear bumper 110 (shown in FIG. 2). The ECU 100 is of the type that is commonly found in a wide variety of automotive vehicles for controlling the various functions of the vehicle. The brake system 104, wheel speed sensors 106, accelerometer 102, HMI interface 108 and ultrasonic sensors 112a-112d are also conventional components in automotive vehicles known to a person skilled in the art. The accelerometer 102 and wheel speed sensors 106 provide information from which it can be determined that a moving vehicle has come to a stop. Other types of known automotive vehicle sensors that detect vehicle motion may also be used in connection with the disclosed system. The HMI interface 108 displays visual messages to the vehicle driver in response to commands from the ECU 100. The ultrasonic sensors 112a-112d detect when an object is within a predefined range of the sensors.

Figure 3:
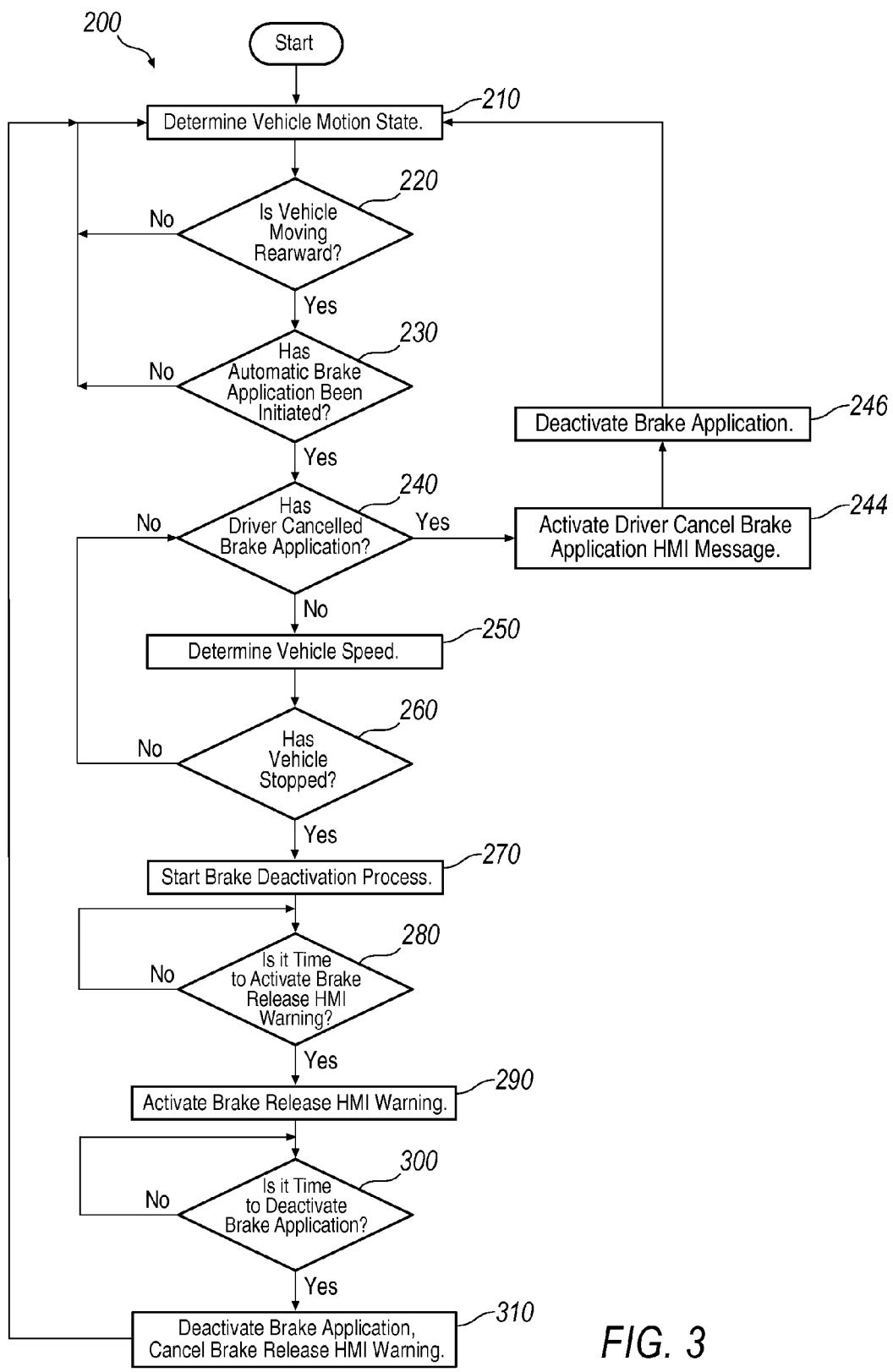
FIG. 3 is a flowchart illustrating an exemplary algorithm for controlling the deactivation of the vehicle's reverse brake assist system and Host Messaging Interface (MHI) messages/alerts.

FIG. 3 is a flowchart that illustrates exemplary steps that are employed to control the deactivation of the vehicle's automatic brake assist system after it has been activated. Prior to the execution of the steps shown in FIG. 3 to deactivate the vehicle's automatic brake assist system, it is presumed that the vehicle's automatic brake assist system has been activated. That activation occurs when, in response to signals from the ultrasonic sensors 112a-112d (for example), the ECU 100 determines that the automatic vehicle brakes 104 should be automatically applied and issues a command to the brakes 104 to activate. Thereafter, the steps of FIG. 3 are executed by the ECU 100

The method to deactivate the brake assist system starts at step 200 in FIG. 3. Steps 210-260 are directed to determining the motion state of the vehicle 10. At step 210, the vehicle motion state is determined using information from the vehicle's wheel speed sensors, accelerometer and/or transmission gear selection (for example). Furthermore, in view of the disclosures made herein, a skilled person will appreciate that other existing sensors and systems of a vehicle can be used for acquiring or estimating information characterizing vehicle motion state. At step 220, the system further determines if the vehicle's is moving rearward. If the vehicle is moving rearward, then the system proceeds on to step 230. If the system determines that the vehicle is not moving rearward then it loops back to step 210. At step 230, the system determines the state of the brake system as to if the vehicle's reverse brake assist system has been automatically applied the brakes. If it has, then the system proceeds to step 240, if it hasn't the system will loop back to step 210. If both conditions 220 and 230 are true, then the system determines (at step 240) if the driver has manually canceled the application of the automotive brake system. If so, then the ECU 100 causes (step 244) an HMI (Host Message Interface) message to be displayed and/or an audible warning indicating that the driver has cancelled the application of the automotive reverse brake assist system and the automatic brake application is going too released. The ECU 100 also causes (step 246) deactivation of the brake application.

If the driver has not canceled application of the vehicle's reverse brake assist system, then the ECU 100 determines (step 250) the speed of the vehicle. At step 260, the ECU 100 determines if the vehicle has stopped (i.e., vehicle speed is zero). If not, then the algorithm loops back to step 240 to determine if the driver has canceled application of the brake system. If the vehicle has stopped, then the ECU 100 starts the automatic brake deactivation process at steps 270 through 310. Specifically, at step 280, the ECU 100 determines if it is time to display an HMI message indicating that the vehicle brakes are going to be released. If not, then the algorithm loops back to step 280. If so, then, the ECU 100 causes (step 290) an HMI message to be activated alerting the driver of the imminent release of the vehicle brakes. Then, the ECU determines (step 300) if it is time to deactivate the brake application. If not, then the algorithm loops back to step 300. If so, then the ECU 100 causes (step 310) deactivation of the vehicle brakes and the HMI alert message is canceled. At this point, the vehicle brake system has been deactivated. Accordingly, the algorithm loops back to step 210 to determine the vehicle state. The looping at steps 280 and 300 causes the deactivation of the vehicle brakes a pre-determined time period after it is determined that the vehicle has stopped.

As can be seen, the above-described system and method causes deactivation of the vehicle automatic brake system a pre-determined time after detection of the vehicle being stopped. As compared to systems wherein the vehicle brake system is deactivated a pre-determined period of time after its activation due to detection of the object in the rearward vehicle path, the system and method described above will ensure that the vehicle comes to a stop under any driving conditions before the brake system is deactivated.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation. For example, the above-described system and method could be used for forward motion (in addition to or instead of rearward motion).

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method of deactivating, via an electronic controller, a vehicle brake system that had been previously automatically activated in response to detection by a first sensor of an object in the intended path of the vehicle, comprising:
   detecting, via a second sensor, when motion of the vehicle has stopped;
   determining whether to cause deactivation of the vehicle brakes in response to the second sensor; and
   automatically deactivating the vehicle brakes a pre-determined period of time after the motion of the vehicle has stopped, wherein the pre-determined period of time includes a duration to complete the determining step.

2. The method of claim 1, wherein said motion is in the rearward direction.

3. The method of claim 1, further comprising a step of displaying an HMI (Host Message Interface) message indicating imminent release of the vehicle braking system before the automatically deactivating step.

4. The method of claim 3, wherein the pre-determined period of time further includes a duration to complete the step of displaying the HMI message.

5. A braking system for an automotive vehicle, comprising:
   an electronic controller communicatively coupled to a vehicle brake system and a vehicle motion detection device;
   said electronic controller configured to:
   cause said vehicle brake system to be automatically activated in response to receiving a signal indicative of an object being detected in a path of the vehicle;
   receive a signal from said vehicle motion detection device indicative that rearward motion of the vehicle has stopped;
   determine whether to cause deactivation of said vehicle brake system in response to receiving said signal from said motion detection device; and
   communicate with said brake system so as to deactivate application of said brake system a pre-determined amount of time after receiving said signal indicative that motion of the vehicle has stopped, wherein said pre-determined amount of time includes a duration said electronic controller takes to determine whether to cause deactivation of said vehicle brake system.

6. The system of claim 5, wherein said motion is in the rearward direction.

7. The system of claim 5, wherein said controller is further configured to cause an HMI (Host Message Interface) message indicating imminent deactivation of the brake system to be displayed.

8. The system of claim 7, wherein said pre-determined amount of time further includes a duration said electronic controller takes to cause said HMI (Host Message Interface) message to be displayed.

9. The system of claim 5, wherein said vehicle motion detection device is a vehicle speed sensor.

10. The system of claim 5, wherein said vehicle motion detection device is an accelerometer.

11. A method of controlling, via an electronic controller, an automatic braking system for an automotive vehicle, comprising:
   detecting, via a first sensor, an object in a path of the vehicle;
   automatically applying the braking system to stop motion of the vehicle;
   detecting, via a second sensor, when the motion of the vehicle has stopped;
   determining whether to release the vehicle braking system in response to the second sensor; and
   releasing the vehicle braking system a pre-determined period of time after the motion of the vehicle has stopped, wherein the pre-determined period of time includes a duration the determining step takes to complete.

12. The method of claim 11, wherein said motion is in the rearward direction.

13. The method of claim 11, further comprising the step of displaying an HMI (Host Message Interface) message indicating imminent release of the vehicle braking system.

14. The method of claim 13, wherein the pre-determined period of time further includes a duration to complete the step of displaying the HMI message.

* * * * *